Patented Jan. 12, 1943

2,307,801

UNITED STATES PATENT OFFICE 2,307,801

RUBBER ADHERENT COMPOSITION

Robert C. Pierce, Niles, Mich., assignor to National-Standard Company, a corporation of Michigan No Drawing. Application December 11, 1940, Serial No. 369,661

4 Claims. (Cl. 117—75)

This invention relates primarily to a method of insuring the adhesion of metal, particularly ferrous metal base wire, to rubber stocks.

In Domm Patents 2,002,261, 2,002,262 and 2,002,263 are disclosed various rubber adherent coatings for metal bases. The preferred coating composition consists of a thin layer of copper over zinc, lead, tin or cadmium, the copper being thin enough to alloy throughout with the underlying metal, and thus produce a copper-bearing alloy having adherence to rubber.

While the Domm inventions have been used commercially on a very large scale, particularly for tire bead reinforcing wires, the rubber compounds which the rubber companies employ for this purpose are secretly compounded by each company and are varied from time to time. The adhesiveness of wire is different for each of the various bead stocks, and while the copper-bearing coatings are generally adherent to all bead stock, there are some in which the adhesiveness is not all that is desired. This lack of adhesiveness is indicated by the fact that when the wire is coated with raw rubber stock, before vulcanization, and is then cut, the rubber tends to peel back from the ends of the wire.

It has now been discovered that the adhesiveness of metals to rubber, particularly of copper-bearing metals to rubber, may be increased, regardless of the type of rubber bead stock employed, by coating the wire with a small amount of resin, particularly a synthetic resin of the coumarone type.

While the invention is primarily adapted for use on ferrous metal base tire bead wires, it may be used on other metal objects for the same purpose. The preferred wire has a diameter of approximately 0.025 inch, and has a zinc coating of from 0.00005 to 0.00025 inch. The copper coating thereon is initially from 0.0000025 to 0.000016 inch. The zinc may be replaced by cadmium, tin or lead.

The preferred resin is a para-coumarone type material, for example, that sold under the name of Cumar. It is preferably applied dissolved in a volatile solvent. The solvent is immaterial, benzene, xylene, or carbon tetrachloride being typical satisfactory solvents. The concentration of resin in the solvent is of little importance. A solution containing 1 oz. per gallon gives substantially the same results as one containing 50 oz. per gallon. Other resins, preferably synthetic resins, may be employed in place of the coumarone type. Pine rosin has also been found satisfactory.

The solution is preferably applied by running the wire through it and allowing the solvent to evaporate, thus retaining only as much solution as will be held by surface tension.

The foregoing detailed description has been given for clearness of understanding only, and no unnecessary limitations should be understood therefrom.

What I claim as new, and desire to secure by Letters Patent, is:

1. A product comprising a metal base having a thin coating of predominantly cuprous metal adherent to vulcanized rubber on a surface thereof, a thin coating of rubber-compatible resin deposited from a solution adhering to the base by surface tension on the cuprous metal coating, and a coating of unvulcanized rubber of a character adherent to the metal after vulcanization over the resin.

2. A product as set forth in claim 1 in which the resin is a coumarone resin.

3. A product as set forth in claim 1 in which the resin is rosin.

4. A product as set forth in claim 1 in which the base is a steel wire having a thin zinc coating beneath a thin copper coating upon which the resin is deposited.

ROBERT C. PIERCE.